(12) United States Patent
Nien et al.

(10) Patent No.: US 12,199,472 B2
(45) Date of Patent: Jan. 14, 2025

(54) IRON CORE STRUCTURE OF MOTOR ROTOR

(71) Applicant: HIWIN MIKROSYSTEM CORP., Taichung (TW)

(72) Inventors: Yu-Cheng Nien, Taichung (TW); Yuan-Kai Lin, Taichung (TW)

(73) Assignee: HIWIN MIKROSYSTEM CORP., Taichung (TW)

( * ) Notice: Subject to any disclaimer, the term of this patent is extended or adjusted under 35 U.S.C. 154(b) by 362 days.

(21) Appl. No.: 17/880,313

(22) Filed: Aug. 3, 2022

(65) Prior Publication Data

US 2024/0048010 A1 Feb. 8, 2024

(51) Int. Cl.
*H02K 1/27* (2022.01)
(52) U.S. Cl.
CPC ..................................... *H02K 1/27* (2013.01)
(58) Field of Classification Search
CPC ...... H02K 1/27; H02K 1/276; H02K 2213/03; H02K 15/12
See application file for complete search history.

(56) References Cited

U.S. PATENT DOCUMENTS

| | | | | |
|---|---|---|---|---|
| 2011/0285216 | A1* | 11/2011 | Kurronen | H02K 1/276 29/598 |
| 2012/0274165 | A1* | 11/2012 | Fukaya | H01F 41/005 310/156.01 |
| 2014/0167551 | A1 | 6/2014 | Arimatsu et al. | |
| 2016/0079817 | A1* | 3/2016 | Hayashi | H02K 1/22 29/598 |
| 2019/0109525 | A1* | 4/2019 | Gangi | H02K 15/12 |

FOREIGN PATENT DOCUMENTS

| | | |
|---|---|---|
| CN | 207382162 | 5/2018 |
| CN | 213585316 | 6/2021 |
| DE | 102017217937 | 4/2019 |
| DE | 102019135896 | 7/2021 |
| WO | WO-2019072472 A1 * | 4/2019 |

OTHER PUBLICATIONS

Translation of WO-2019072472-A1 Apr. 18, 2019.*

* cited by examiner

*Primary Examiner* — Christopher M Koehler
*Assistant Examiner* — Riley Owen Stout
(74) *Attorney, Agent, or Firm* — Guice Patents PLLC

(57) ABSTRACT

Main technical features of an iron core structure of motor rotor provided by the invention are that on a rotor iron core of a rotating motor, along a circumferential direction of a rotation axis of the motor as a center of circle, a plurality of through-hole-shaped spaces spaced apart from each other are arranged on the iron core in sequence. When the through-hole-shaped spaces form obstacles to a magnetic circuit in the rotor, the through-hole-shaped spaces are also provided for insertion of a plurality of straight rod-shaped coupling elements made of non-permeability magnetic material to fix an overlapping state of a plurality of silicon steel plates of the iron core in order to improve an overall rigidity of the iron core and reduce a possibility of deformation or damage of the silicon steel plates caused by centrifugal force of high-speed rotation.

9 Claims, 4 Drawing Sheets

IRON CORE STRUCTURE OF MOTOR ROTOR

BACKGROUND OF THE INVENTION

Field of Invention

The invention relates to motor technology, and more particularly to an iron core structure of motor rotor.

Related Art

In order to suppress the stress on the spindle motor rotor caused by centrifugal force under high-speed rotation, in the patent publication US20140167551A1, a shape design of the magnetic barrier hole on the side of the rotor magnet groove is adopted, and the smooth arc shape of the hole wall on the outer diameter of the magnetic barrier hole is used to reduce the maximum stress of the narrowest area between this part and the outer diameter of the rotor under the action of centrifugal force, under high-speed rotation of the rotor, even though there is damage caused by stress concentration, it will be limited to the narrowest area to avoid scattering toward the stator side.

At the same time, the '551A1 patent also clearly pointed out that it is not recommended to use through holes to penetrate the rotor to provide insertion and combination of bolts, because the through hole will become a new stress concentration point, which will reduce the strength of the rotor. Moreover, as far as the spindle motor is concerned, the conventional technology improves the rigidity by increasing the diameter of the spindle to obtain a technical means of good machining accuracy, which also leads to relative reduction in the radial thickness of the rotor element surrounding the spindle peripheral side. Within the limited radial thickness range of the rotor, it is difficult to additionally dispose the through holes to achieve an object of fixing and combining the iron core silicon steel plates with the bolts.

SUMMARY OF THE INVENTION

A main object of the invention is to provide an iron core structure of motor rotor capable of improving a structural rigidity of a rotor iron core, so that the motor rotor can especially meet high-speed rotation requirements of a spindle motor.

In order to achieve the above-mentioned object, main technical features of an iron core structure of motor rotor provided by the invention are that on a rotor iron core of a rotating motor, along a circumferential direction of a rotation axis of the motor as a center of circle, a plurality of through-hole-shaped spaces spaced apart from each other are arranged on the iron core in sequence. When the through-hole-shaped spaces form obstacles to a magnetic circuit in the rotor, the through-hole-shaped spaces are also provided for insertion of a plurality of straight rod-shaped coupling elements made of non-permeability magnetic material to fix an overlapping state of a plurality of silicon steel plates of the iron core in order to improve an overall rigidity of the iron core and reduce a possibility of deformation or damage of the silicon steel plates caused by centrifugal force of high-speed rotation.

Further, the through-hole-shaped spaces respectively comprise a through-hole-shaped magnetic barrier space and a through hole adjacent to and communicated with the magnetic barrier space, and each of the through-hole-shaped spaces is located on two sides of a magnet groove of the rotor iron core in the circumferential direction, wherein the through-hole-shaped spaces located on the two sides of the single magnet groove are mirrored with a diameter of the circumference as a mirror axis, and communicate with the magnet groove through the magnetic barrier spaces.

Wherein the magnetic barrier space communicates with the magnet groove adjacently by a first side, and communicates with the through hole adjacently by a second side, and an inner diameter of the first side of the magnetic barrier space is greater than an inner diameter of the second side, a specific shape of the magnetic barrier space with varying diameters can be a triangular plane geometric shape in a radial section of the circumference.

At the same time, the inner diameter of the second side of the magnetic barrier space is also smaller than an inner diameter of the through hole, so that the coupling element inserted into the through hole will not be displaced radially through a communicating part between the magnetic barrier space and the through hole into the magnetic barrier space to achieve an efficacy of restraining and positioning the coupling element.

And, an inner diameter of the communicating part between the magnetic barrier space and the magnet groove is smaller than the inner diameter of the first side of the magnetic barrier space, and is also smaller than a groove space height of the magnet groove in a radial direction of the circumference to ensure that a magnet embedded in the magnet groove will not be displaced into the magnetic barrier space through the communicating part between the magnet groove and the magnetic barrier space, thereby providing an efficacy of restraining and positioning the magnet in the magnet groove.

DETAILED DESCRIPTION OF THE INVENTION

First of all, an iron core structure of motor rotor described in a preferred embodiment of the invention is taken as an example of a rotor element of a spindle motor for using in high-speed rotation. However, the parts in the overall technology of the spindle motor that do not interfere with the disclosure of the technical features of the invention will not be mentioned in the following description, the omitted parts belong to the prior technology known to a person having ordinary skill in the art to which the invention pertains before the application of the invention, and the omitted parts do not affect the completeness of the disclosure of the main technical features of the invention.

Figure 1:
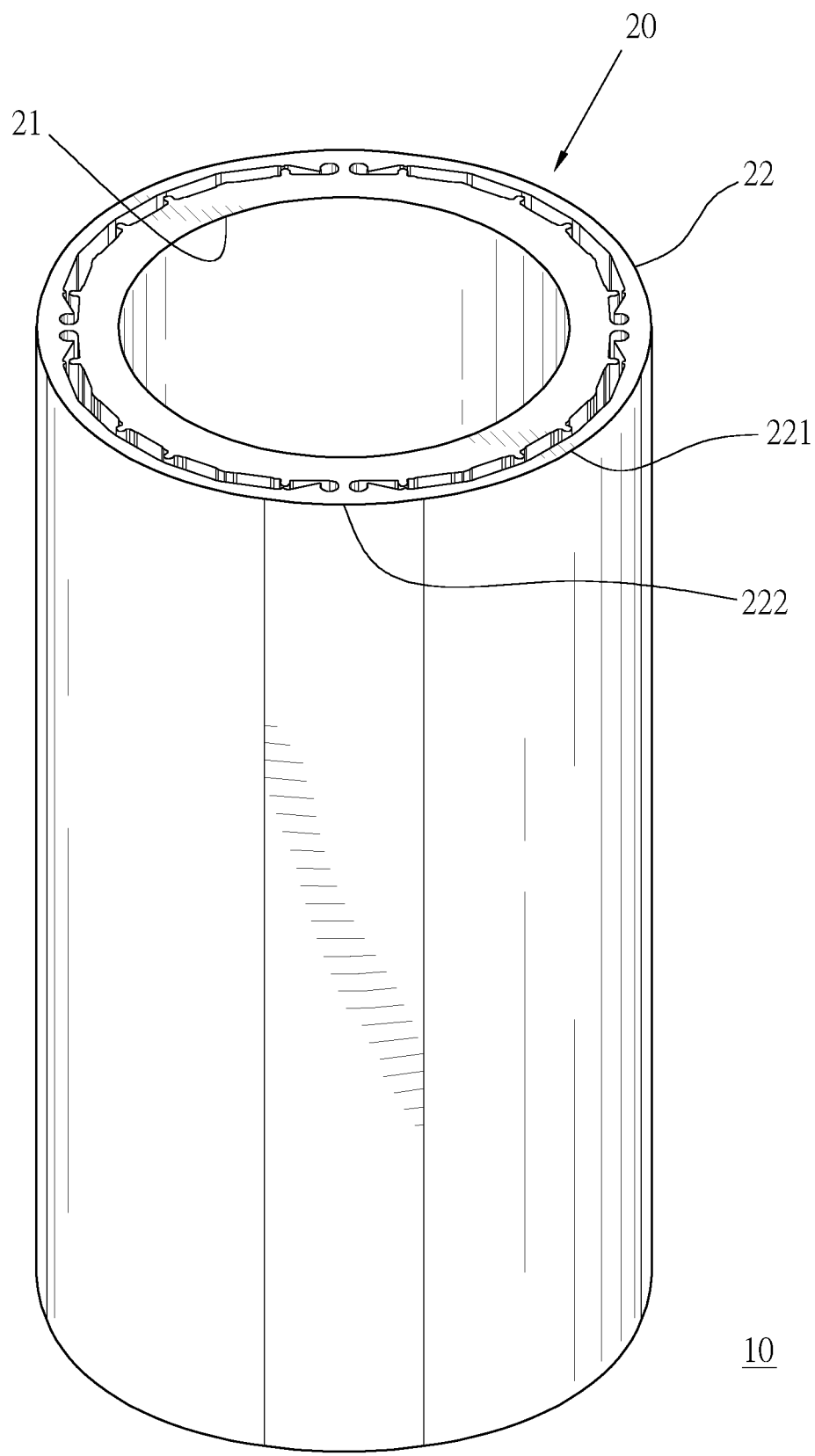
FIG. 1 is a perspective view of a preferred embodiment of the invention.
Figure 2:
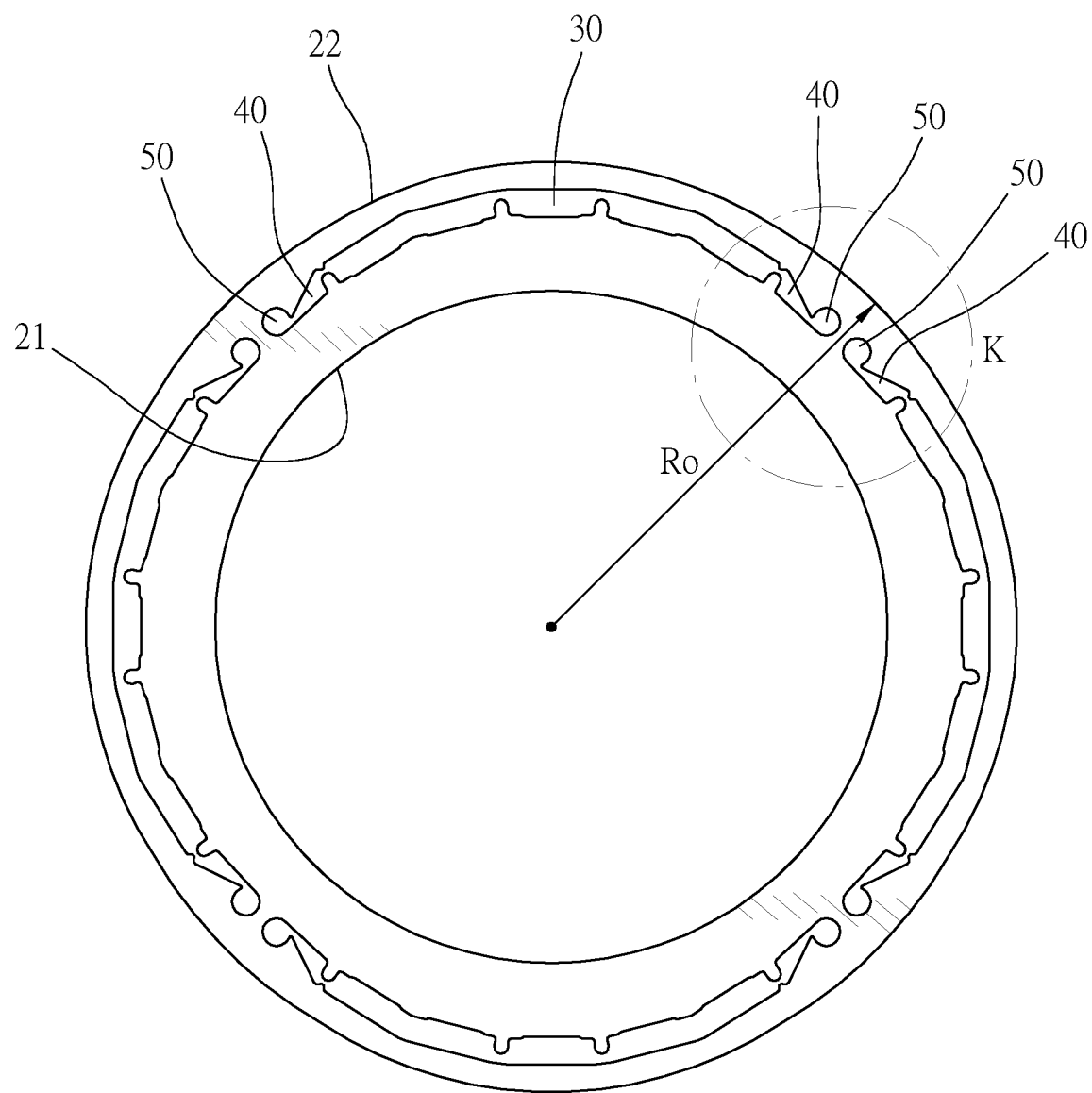
FIG. 2 is a cross-sectional view of a preferred embodiment of the invention along the section line 2-2 in FIG. 1.

Please refer to FIG. 1 and FIG. 2. An iron core structure of motor rotor 10 provided in a preferred embodiment of the invention mainly comprises an iron core 20, a plurality of hole-shaped magnet grooves 30, a plurality of paired magnetic barrier spaces 40, a plurality of through holes 50, and a plurality of coupling elements 60.

The iron core 20 is an annular tubular element formed by coaxially overlapping a plurality of annular silicon steel plates in sequence, and has an inner annular surface 21 defined by a tubular inner tube wall, and an outer annular surface 22 defined by a tubular outer tube wall, wherein a cross-sectional shape of the inner annular surface 21 in a radial direction is circular; a cross-sectional shape of the outer annular surface 22 in a radial direction can be circular, or can be formed by a plurality of first arcs 221 and a plurality of second arcs 222 of two different radians alternately connected in series sequentially, as disclosed in this embodiment, and a center of curvature of the outer annular surface 22 is coaxial or parallel to a center of circle of the inner annular surface 21.

The magnet grooves 30 are respectively penetratingly disposed in the iron core 20 along the center of circle of the inner annular surface 21 axially, and disposed between the inner annular surface 21 and the outer annular surface 22 in order to accommodate magnets (not shown in the figures) in a hole space of each of the magnet grooves 30, and to provide positioning for the accommodated magnets through a hole wall of each of the magnet grooves 30, so that the magnets can be embedded tightly inside the iron core 20, but a specific shape of the magnet grooves 30 is not a technical feature of the invention, so it will not be described in detail in this specification.

The magnetic barrier spaces 40 are hole-shaped structures adjacently communicated with two sides of each of the magnet grooves 30 by mirroring in pairs using a diameter of the inner annular surface 21 as a mirror axis, and penetratingly disposed in the iron core 20 by extending along an axial direction parallel to the center of circle of the inner annular surface 21, and respectively communicated with the adjacent magnet groove 30 by a first side 41.

The through holes 50 are respectively penetratingly disposed in the iron core 20 by extending along an axial direction parallel to the center of circle of the inner annular surface 21, and communicated in pairs adjacently with a second side 42 of the paired magnetic barrier spaces 40.

Figure 4:
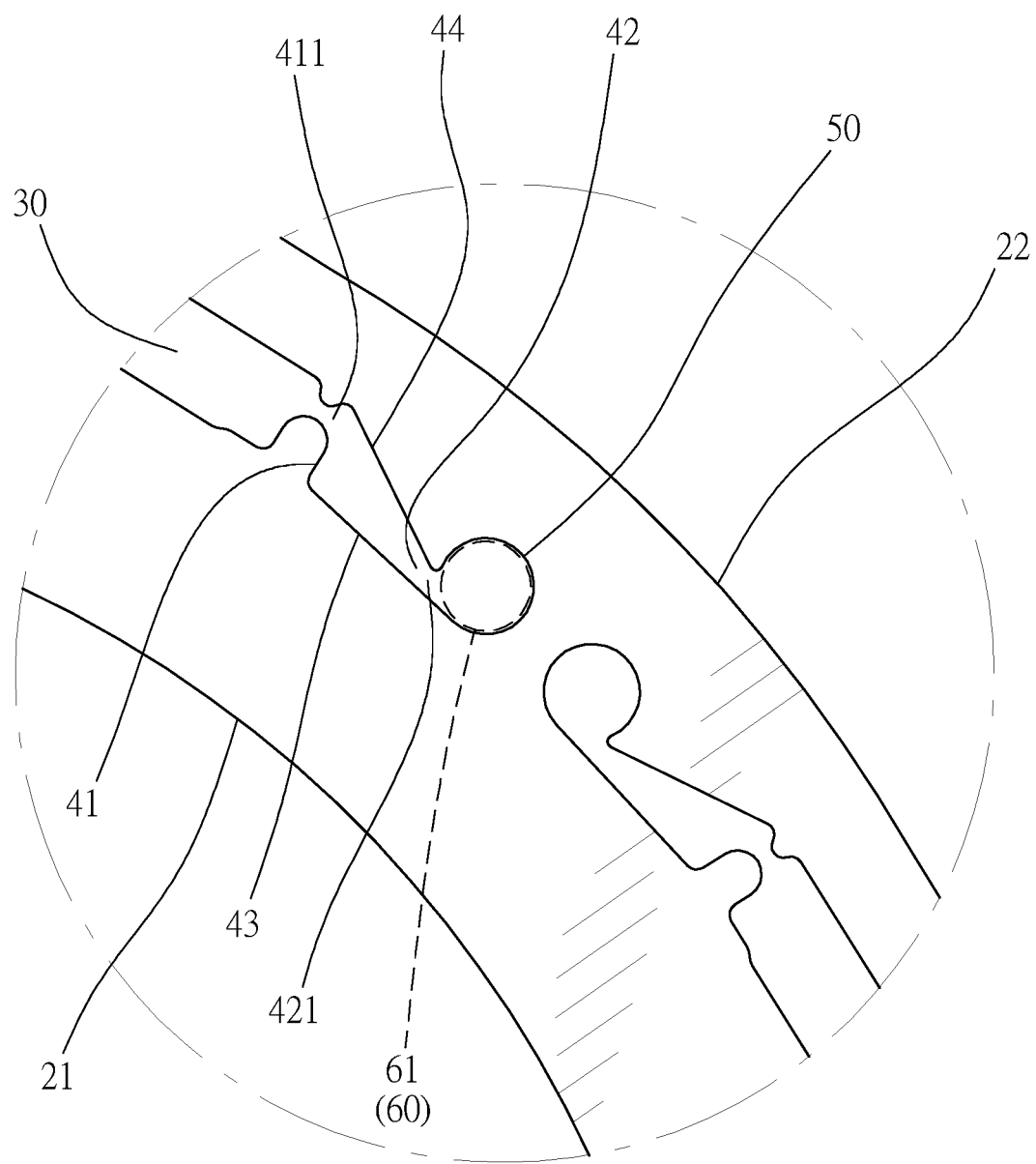
FIG. 4 is an enlarged view of the partial area K of FIG. 2 according to a preferred embodiment of the invention.

Please refer to FIG. 4, each of the coupling elements 60 has a straight rod-shaped shaft 61 made of non-permeability magnetic material (such as stainless steel or aluminum), and is inserted into each of the through holes 50, two ends of the shaft 61 protrude out of end faces of two ends of a tube axis of the iron core 20; and two end portions (not shown in the figures) of each of the coupling elements 60 are located outside of the two ends of the tube axis of the iron core 20 and respectively fixed to the two ends of the shaft 61 in order to exert force on the silicon steel plates to maintain an overlapping state of the silicon steel plates, and physical properties of the non-permeability magnetic material cause hole spaces of the through holes 50 to be capable of still maintaining their obstructive effect on a magnetic circuit.

Figure 3:
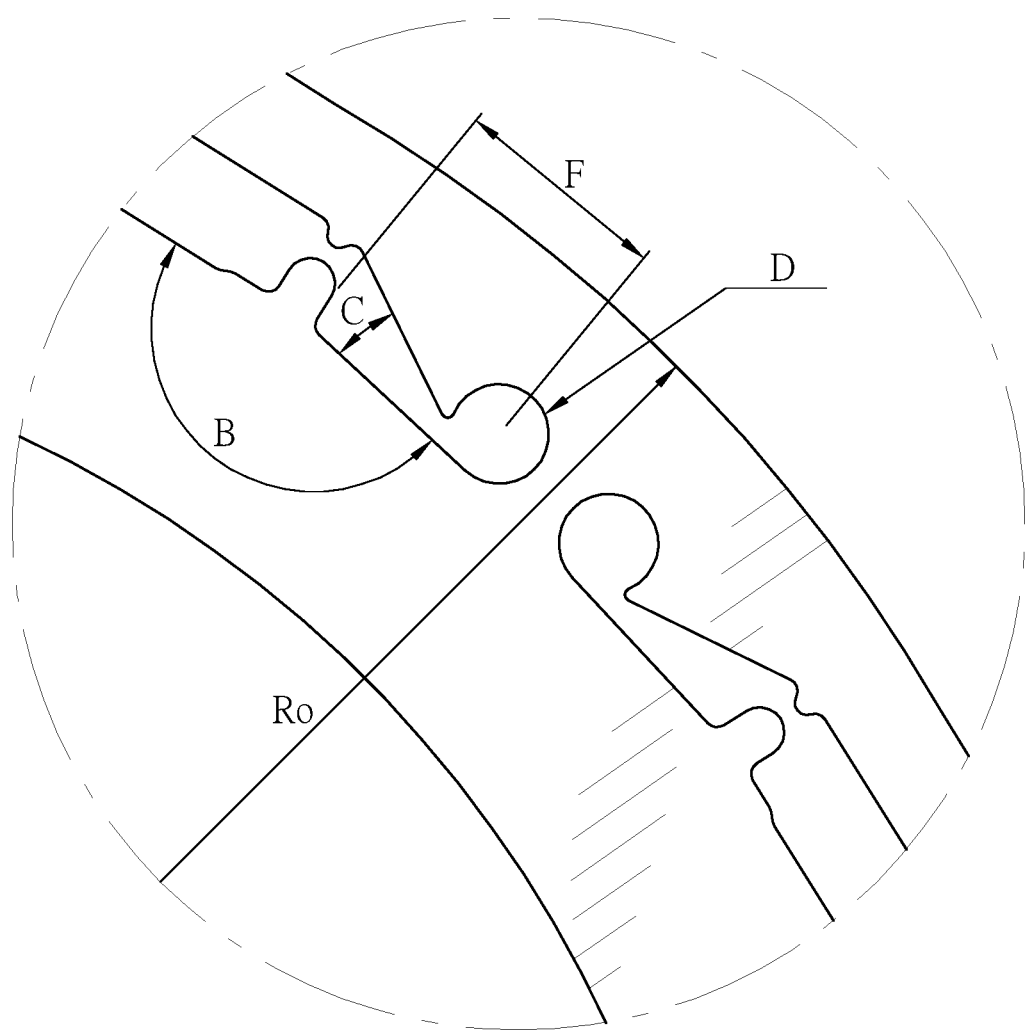
FIG. 3 is an enlarged view of the partial area K of FIG. 2 according to a preferred embodiment of the invention.

In order to facilitate the description of a spatially combination state between the magnet groove 30, the magnetic barrier space 40 and the through hole 50, please refer to FIG. 3, the magnetic barrier space 40 located on one side of the magnet groove 30 communicates with the magnet groove 30 by a part of the first side 41, and an inner diameter of a partial communicating area 411 is smaller than an inner diameter of the first side 41. An inner diameter of a communicating channel 421 communicating a part of the second side 42 of the magnetic barrier space 40 with a part of the through hole 50 is also smaller than an inner diameter D of the through hole 50. With differences in the inner diameters, when the magnet groove 30, the magnetic barrier space 40 and the through hole 50 are communicated with one another, the magnet embedded in the magnet groove 30 and the shaft 61 inserted into the through hole 50 can be prevented from shifting into the magnetic barrier space 40 through the communicating area 411 or the communicating channel 421.

Wherein a specific shape of the through hole 50 in this embodiment is circular in a radial section, and a radial section shape of the shaft 61 is circular to correspond to a shape of the through hole 50, so that a peripheral rod wall of the shaft 61 can be correspondingly abutted on a hole wall of the through hole 50, and the shaft 61 can be sleevely inserted into the through hole 50 securely; in other embodiments, a shape of the through hole 50 can be different from a plane geometric shape of this embodiment, such as oval or polygon.

In addition, a shape of the magnetic barrier space 40 in a radial section is triangular, the first side 41 defines a first side of the triangle, an inner hole wall 43 of the magnetic barrier space 40 close to the inner annular surface 21 defines a second side of the triangle, and an outer hole wall 44 of the magnetic barrier space 40 close to the outer annular surface 22 defines a third side of the triangle, and the communicating channel 421 is located within a range of the third side.

With composition of the above-mentioned components, the iron core structure of motor rotor 10 provides the through holes 50 for insertion of the coupling elements 60 in order to achieve effective fixation for tightly coupling the stacked silicon steel plates and improving a rigidity of the iron core 20. And, a magnetic barrier effect jointly formed by the through holes 50 and the magnetic barrier spaces 40 can be further maintained due to non-permeability magnetic properties of the coupling elements 60 being limited, enabling the iron core structure of motor rotor 10 to have both strength and electromagnetic properties of the iron core 20, which is an obvious improvement compared with the prior art.

Further, please refer to FIG. 3, in order to obtain better mechanical properties performance for the iron core structure of motor rotor 10, the invention further studies dimensions of the magnetic barrier spaces 40 and the through holes 50, data shown in Table 1 below have proved that the invention has a good performance in terms of safety factor compared with the prior art.

TABLE 1

| Parameter | X1 | X2 | X3 | X4 | X5 | X6 | X7 | X8 | X9 |
|---|---|---|---|---|---|---|---|---|---|
| B (°) | 160 | 170 | 170 | 170 | 170 | 170 | 170 | 170 | 170 |
| C (°) | 20 | 20 | 16 (min) | 30 | 20 | 20 | 20 | 20 | 20 |
| α | 6.04 | 6.04 | 6.04 | 6.04 | 1.89 (min) | 4.53 | 7.55 | 6.04 | 6.04 |

TABLE 1-continued

| Parameter | X1 | X2 | X3 | X4 | X5 | X6 | X7 | X8 | X9 |
|---|---|---|---|---|---|---|---|---|---|
| γ | 13.02 | 13.02 | 13.02 | 13.02 | 13.02 | 13.02 | 13.02 | 11.32 (min) | 14.34 (MAX) |
| Safety factor | 1.01 | 1.28 | 1.15 | 1.13 | 1.11 | 1.38 | 1.09 | 1.16 | 1.36 |

In the above table, B is a first included angle, which is an included angle between the inner hole wall 43 of the magnetic barrier space 40 and an inner groove surface 31 of the adjacently communicated magnet groove 30 close to the inner annular surface 21 in a radial direction of the iron core 20.

C is a second included angle, which is an interior angle between the inner hole wall 43 and the outer hole wall 44 of the magnetic barrier space 40 in a radial direction of the iron core 20.

The magnetic barrier spaces 40 and the communicated magnet grooves 30 satisfy $150° \leq B \leq 190°$ and $16° \leq C \leq 35°$, wherein;

the through holes 50 satisfy the right equation (I), $\alpha = D/Ro \times 100\%$, $1.9\% \leq \alpha \leq 10.1\%$.

In the equation, D is a diameter of the through holes 50, and Ro is a radius of the second arcs 222. The magnetic barrier spaces 40 and the adjacently communicated through holes 50 satisfy the following equation (II)

$$\gamma = F/Ro \times 100\%, 11.3\% \leq \gamma \leq 14.3\%. \qquad \text{equation (II)}$$

In the equation, F is a width of magnetic barrier, which is defined as a width of magnetic barrier between each of the magnetic barrier spaces 40 and each of the through holes 50 communicated with each other, F is a straight distance between the first side 41 and a position of a center of curvature of the through hole 50; Ro is the radius of the second arcs 222.

As shown in Table 1 above, the iron core structure of motor rotor 10 is capable of effectively improving its safety factor to more than 1.01, and improving a rigidity performance of the iron core 20 under high-speed rotation, thereby reducing possible generation of deformation or damage under an action of centrifugal force.

What is claimed is:

1. An iron core structure of motor rotor comprising:
an annular iron core formed by coaxially overlapping a plurality of annular silicon steel plates in sequence, having an inner annular surface and an outer annular surface, and the outer annular surface being formed by a plurality of first arcs and a plurality of second arcs of two different radians alternately connected in series sequentially;
a plurality of magnet grooves spaced apart from one another, respectively disposed between the inner annular surface and the outer annular surface of the iron core, and penetratingly disposed in the iron core by extending along an axial direction parallel to a center of curvature of the inner annular surface of the iron core;
a plurality of paired through holes respectively penetratingly disposed in the iron core by extending along an axial direction parallel to the center of curvature of the inner annular surface of the iron core, and spaced apart from each other on two sides of each of the magnet grooves in a radial direction;
a plurality of paired hole-shaped magnetic barrier spaces respectively penetratingly disposed in the iron core by extending along an axial direction parallel to the center of curvature of the inner annular surface of the iron core, the paired magnetic barrier spaces being respectively disposed between one of the two sides of each of the magnet grooves and each of the paired through holes, communicating with the magnet groove by a first side, and communicating with the through hole by a second side; and
a plurality of straight rod-shaped coupling elements made of non-permeability magnetic material respectively inserted and fixed in each of the through holes, exerting opposing forces on two axial ends of the iron core, and acting on the overlapped silicon steel plates;
a hole wall of each of the through holes being abutted on a peripheral surface of each of the coupling elements inserted into a hole space of each of the through holes;
an inner diameter of each of the first sides being greater than an inner diameter of each of the second sides;
an inner diameter of each of the first sides being greater than an inner diameter of a communicating area between each of the first sides and each of the magnet grooves; and
an inner diameter of a communicating channel communicating the second side with the through hole being smaller than an inner diameter of the through hole.

2. The iron core structure of motor rotor as claimed in claim 1, wherein the through holes satisfy the following equation (I), and the magnetic barrier spaces and the adjacently communicated through holes satisfy the following equation (II):

$$\alpha = D/Ro \times 100\%, 1.9\% \leq \alpha \leq 10.1\%; \qquad \text{equation (I)}$$

$$\gamma = F/Ro \times 100\%, 11.3\% \leq \gamma \leq 14.3\%; \text{in the equations}, \qquad \text{equation (II)}$$

D is a diameter of the through holes;
Ro is a radius of the second arcs; and
F is a width of magnetic barrier between each of the magnetic barrier spaces and each of the through holes communicated with each other, and is a straight distance between the first side and a position of a center of curvature of the through hole.

3. The iron core structure of motor rotor as claimed in claim 1, wherein a shape of each of the magnetic barrier spaces is triangular, the first side defines a first side of the triangle, an inner hole wall defines a second side of the triangle, and an outer hole wall defines a third side of the triangle, and a position of each of the through holes communicating with each of the magnetic barrier spaces is located within a range of each of the third sides.

4. The iron core structure of motor rotor as claimed in claim 1, wherein in a radial direction of the iron core, an interior angle between an inner hole wall of the magnetic barrier space close to the inner annular surface of the iron core, and an outer hole wall of the magnetic barrier space close to the outer annular surface of the iron core is between 16° and 35°.

5. The iron core structure of motor rotor as claimed in claim 1, wherein in a radial direction of the iron core, an interior angle between the inner hole wall of the magnetic barrier space close to the inner annular surface of the iron core, and an inner groove surface of the adjacently communicated magnet groove close to the inner annular surface is between 150° and 190°.

6. The iron core structure of motor rotor as claimed in claim 1, wherein each of the coupling elements comprises a straight rod-shaped shaft inserted into each of the through holes, and two end portions located outside of two ends of the iron core axially, and each of the end portions is respectively fixed to two ends of the shaft.

7. The iron core structure of motor rotor as claimed in claim 1, wherein a radial section of each of the through holes is a circular plane geometric shape.

8. The iron core structure of motor rotor as claimed in claim 1, wherein a radial section of each of the through holes is an elliptical plane geometric shape.

9. The iron core structure of motor rotor as claimed in claim 1, wherein a radial section of each of the through holes is a polygonal plane geometric shape.

* * * * *